United States Patent [19]
Cobb

[11] Patent Number: 5,081,786
[45] Date of Patent: Jan. 21, 1992

[54] FISHING LURE ARTICLE

[76] Inventor: Jerry Cobb, P. O. Box 838, West Yellowstone, Mont. 59758

[21] Appl. No.: 586,580

[22] Filed: Sep. 21, 1990

[51] Int. Cl.⁵ ............................................. A01K 91/00
[52] U.S. Cl. ................................. 43/44.89; 43/44.81; 43/42.53
[58] Field of Search ............... 420/562, 580; 43/42.53, 43/42.45, 44.81, 44.89; 164/98, 47

[56] References Cited

U.S. PATENT DOCUMENTS

| | | | |
|---|---|---|---|
| 399,866 | 3/1889 | Gage | 43/44.89 |
| 551,844 | 12/1895 | Benedict | 43/44.81 X |
| 756,009 | 3/1904 | Flegle | 43/44.81 X |
| 2,591,294 | 4/1952 | Ripich | 43/44.81 X |
| 2,989,817 | 6/1961 | Kepler | |
| 3,017,307 | 1/1962 | Halliburton | |
| 3,803,747 | 4/1974 | Cartwright | 43/44.81 X |
| 4,358,422 | 11/1982 | Shaw et al. | 420/580 X |
| 4,450,645 | 5/1984 | Ancona | 43/44.81 X |
| 4,738,047 | 4/1988 | Ryan | 43/42.53 X |
| 4,819,366 | 4/1989 | Manno | 43/44.81 |

FOREIGN PATENT DOCUMENTS 2207841 2/1989 United Kingdom ............... 43/44.81

OTHER PUBLICATIONS

Do-It Lure & Sinker Molds, Catalog 90, Effective 11/1/89.
H. R. 5372, Bill Jul. 25, 1990.
OTS Candidate Pollution Prevention Project, 6/30/89.
Testimony of Steven Hilts Before Senate Environment and Public Works Comm., Jul. 27, 1990.
Bohigian, G. M., Informational Report of the Council on Scientific Affairs, Sep. 1988.

Primary Examiner—Richard K. Seidel
Assistant Examiner—Patty E. Hong
Attorney, Agent, or Firm—Pravel, Gambrell, Hewitt, Kimball & Krieger

[57] ABSTRACT

A method of constructing fishing lures provides for the casting of a mass of melted alloy material at a first melting point temperature of about 500° Fahrenheit wherein the alloy is about 90%-94% tin, and about 4%-8% antimony and substantially lead free. The mass of melted alloy material is allowed to cool until it hardens and in the preferred embodiment the outer surface is dulled to remove shininess.

27 Claims, 2 Drawing Sheets

FISHING LURE ARTICLE

BACKGROUND OF THE INVENTION

1. Field Of The Invention

The present invention relates to fishing, and more particularly to fishing lures of an improved metallic lure construction, and even more particularly relates to an improved fishing lure article having a metallic alloy head portion that is weighted and which has a melting point substantially lower than the melting point of a hook portion connected thereto, and wherein the metallic alloy forming the head portion is about ninety percent (90%) tin, substantially lead free, and provides a dull outer surface that does not frighten fish during use.

2. General Background

The fishing industry uses a wide variety of fishing lures, plugs, spinners, spoons, and the like. One of the common types of fishing lures is referred to as a "jig" which is simply a weighted head of lead material attached to a hook with the barbed portion of the hook being spaced away from the weighted head portion of the jig. The jig also provides an eyelet at the weighted lead head portion for attaching a fishing line thereto. The fisherman can attach various types of worms, collars, spinners, skirts, rubber or plastic tails, and the like to the jigs.

The use of and construction of prior art; lead jigs, is described in the Do-It-Molds catalog of 1990, published and distributed by Do-It Corporation, 501 N. State Street, Denver, Ohio 50622.

Jigs are typically formed by melting lead and pouring the liquid, molten lead into a mold. The above-discussed publication likewise carries a wide variety of melting equipment for melting the lead so that it can be poured into a mold for the construction of a jig. The above publication also discloses a wide variety of feathers, plastic worms, plastic tails, rubber skirts, spoons, and spinners that can be attached to jigs in order to form a final fishing lure product.

The use of lead in the construction of jigs is preferred because the lead provides an easily melted material which is easily poured into the molds for the construction of the various jig fishing lure products. However lead is not without it's shortcomings, as it is a very dangerous product when disposed of in the environment such as when a lure is lost. Lead fishing lures typically shed their disposable feathers, plastic skirts, and plastic worms, after being lost in an underwater environment. Lead can dissolve over a period of time polluting the streams that are filled with game fish. Further, water birds can ingest lead which they find in the bottom of shallow stream beds, causing a problem. These water birds will typically die from poisoning if they ingest too large an amount of lead. Thus, it is a problem in the industry in that the continued use of lead fishing articles is dangerous to fish and water birds.

Several fishing articles have been patented which discuss the use of lead and some other metals in the construction of fishing lures.

An early U.S. Pat. No. 551,844 issued to Benedict, discloses a metal tube attachment for lines, wherein a hook member having a barb is shown attached to a weighted member. The hook is secured by means of a metal tube preferably of copper.

Another early U.S. Patent issued to Flegle relates to a fish hook. The Flegle Patent No. 756,009 shows a hook having a barb with an eyelet portion and a weighted member is attached t the hook. The weighted member is described as being an alloy composed of about two or three parts tin and one part lead in order that it may have sufficient weight and its surfaces retain their natural brightness during use.

The Ripich U.S. Pat. No. 259,294, entitled "Fish Hook Support And Sinker", shows a fishing article that includes a hook with a barbed end portion attached to a leader which also carries a sinker weight.

The Kepler U.S. Pat. No. 2,989,817 entitled "Weigthed Hook With Dual Eyes" shows a jig having a hook portion with a barb and a weighted head portion attached to the hook portion opposite the barb. The weighted portion is described as being a ball like lead weight.

In the Halliburton U.S. Pat. No. 3,017,307 entitled "Process For Attaching Plastic To Metal And Articles Produced Thereby", a jig is shown which has an eyelet, a weighted head portion, a hook portion extending from the weighted head portion, with a barb being carried by the hook. The jig is shown as carrying a skirt attached thereto with a cylindrical rubber band or collar serving as an elastic element. The metal head portion of the lure is described as being formed of a lead alloy because lead is easily molded. However, the inventor also mentions lead, aluminum, copper, iron, galvanized iron, steel, and various alloys of these materials as being associated with the composition of the metal head.

In the Cartright U.S. Pat. No. 3,803,747 there is described a fishing lure for fishing on stream and lake bottoms. The lure includes a weighted body, a cork or other freely slidable buoyant member pivotally attached to the body near the rear thereof, and a hook attached by a swivel connection at the rear of the body. Slit rubber skirting, feathers, or other dressings are described as being attachable to the body. The head portion is weighted and of a lead mass giving the body member weight.

In the Ancona U.S. Pat. No. 4,450,645 entitled "Bottom Fishing Lure", a bottom fishing lure consisting of a fish hook having a weighted non-buoyant head adapted to be pulled along the water bottom by a fishing line, is also adapted to carry a trailing bait. The lure includes a weighted head portion which is described as constituting a lump of lead or other heavy metal molded thereabout.

The Mano U.S. Pat. No. 4,819,366 entitled "Lead-Headed Jig", describes leaded jig structures incorporating fish hooks for knotless attachment to find fishing lines.

Each of the above patents typically requires the use of lead, or describes in only very vague general terms the fact that some other metal might be used. Therefore, the prior art has not solved the problem of a suitable jig and/or fish lure construction that eliminates lead poisoning as a problem for wildlife.

SUMMARY OF THE PRESENT INVENTION

However, the present invention solves a long standing problem in the industry by providing a solution to the problem of lead contamination in wild-life, typically fish and water fowl, which is not disclosed nor rendered obvious by the prior art. Thus, the present invention provides an improved fishing lure article which is substantially free of lead, but which has a dull outer surface that resembles lead so that it will not frighten fish during use.

The present invention provides an improved fishing lure article comprising a metallic hook portion having a barbed end and a weighted head portion placed opposite the barbed end of the hook and attached to the hook. The weighted head portion is of a metallic alloy material with a melting point substantially lower than the melting point of the hook portion, and wherein the metallic alloy forming the head portion is about ninety percent (90%) tin and substantially lead free.

In the preferred embodiment, the alloy for the head is about ninety percent (90%) tin and about four to eight percent (4%-8%) antimony. The alloy has a preferred density of about 0.260-0.275 pounds per square inch, which is lighter than lead. The melting point is about 500° F.-600° F. which is substantially lower than the melting point of hooks.

In another embodiment, the alloy can be about ninety to ninety-four percent (90%-94%) tin and between about six and eight percent (6%-8%) antimony.

The article of the present invention provides a treated outer surface which is dull so that it does not have the shininess that would typically be associated with a metallic molded member other than lead which is soft and dull upon molding, yet the present invention is substantially lead free.

The present invention also provides an improved method for forming fishing articles.

BRIEF DESCRIPTION OF THE DRAWINGS

For a further understanding of the nature and objects of the present invention, reference should be had to the following detailed description taken in conjunction with the accompanying drawings, in which like parts are given like reference numerals, and wherein.

DETAILED DESCRIPTION OF THE PREFERRED EMBODIMENT

Figure 1:
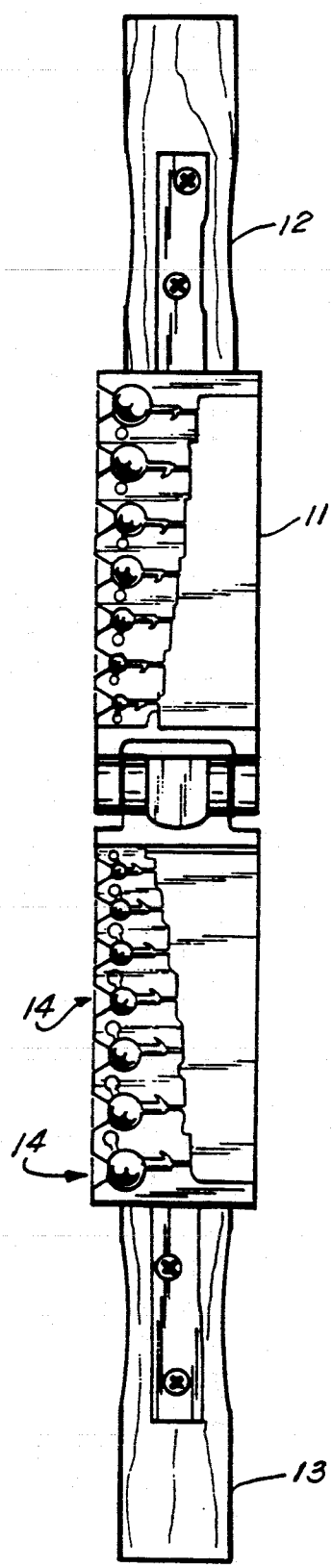
FIG. 1 is an example of a mold, available in the prior art for use with the method of the present invention.
Figure 2:
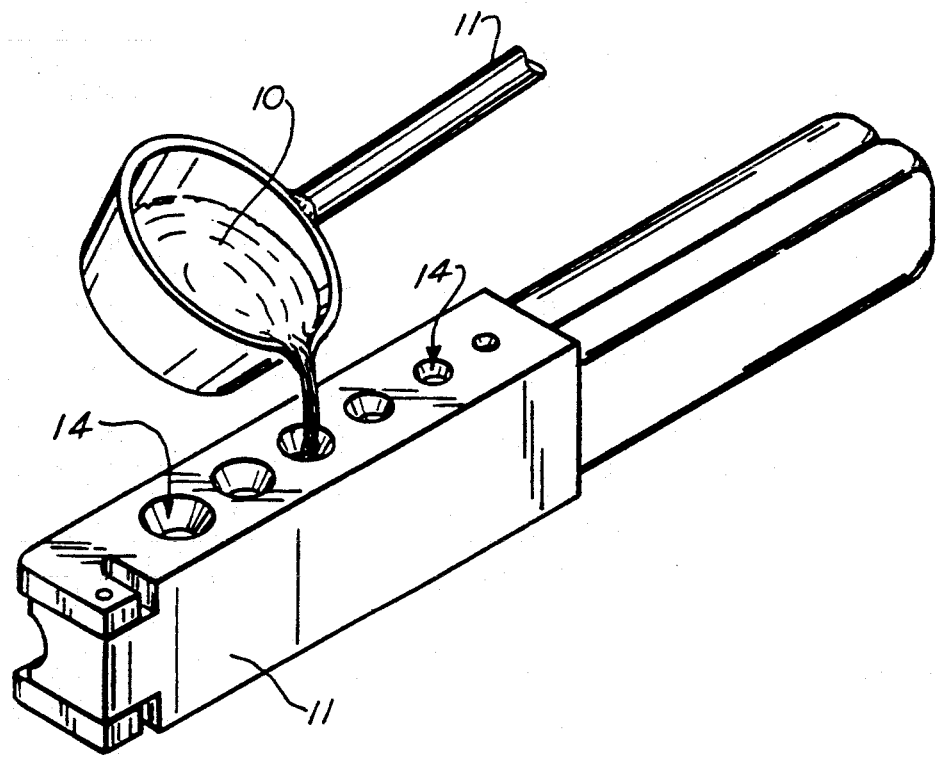
FIG. 2 is a perspective fragmentary view illustrating the mold of FIG. 1 illustrating its use by the pouring of molten alloy thereinto.

In FIG. 1, there can be seen a mold 11 having handles 12, 13, and a plurality of receptacles 14 each of which can be filled with a molten metallic alloy material in keeping with the method of the present invention. The mold is commercially available and is shown for illustration purposes. In FIG. 2, the mold 11 is illustrated in closed operative positions with a plurality of openings 14 being filled with molten metallic alloy 10 as part of the method of the present invention using ladle 15 having handle 17. The ladle 15 is a commercially available item.

Figure 3:
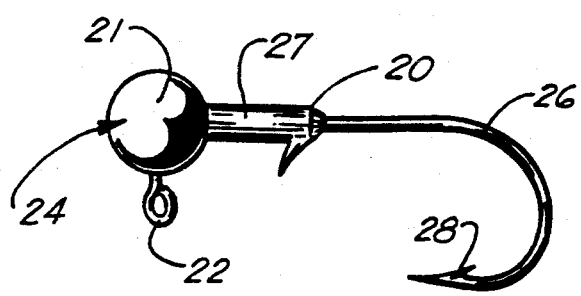
FIG. 3 is a side view of an example of the article manufactured in using the method of the present invention after the initial casting step.

In FIG. 3, an example of a fishing article 20 is manufactured using the method of the present invention as illustrated wherein the lure article 20 has a weighted head portion 21 and an eyelet for attaching fishing line thereto. The outer surface 24 of the head 21 in FIG. 3 is shiny, having been molded in the mold assembly 11. A hook 26 is attached to the weighted head portion at tubular section 27, the hook having an opposite end portion 28 which is in the form of a barb.

Figure 4:
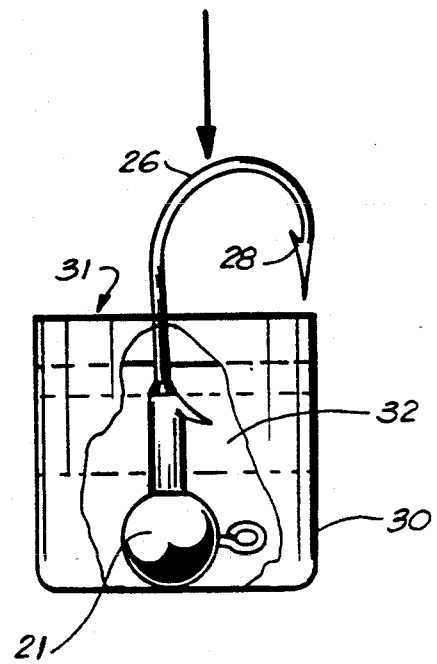
FIG. 4 is a side view illustrating the acid washing method step of the present invention.
Figure 5:
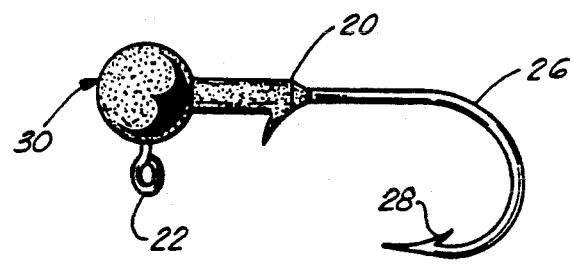
FIG. 5 is a side view of the preferred embodiment of the apparatus of the present invention.
Figure 6:
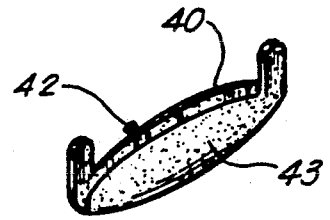
FIG. 6 is a perspective view of another embodiment of the apparatus of the present invention in the form of a split sinker.

In FIGS. 4, 5, and 6, additional method steps of the present invention are illustrated. In FIG. 4, a vat or vessel 30 has an interior 31 for containing acid 32 which is used to wash the weighted head portion 21 to remove the shininess therefrom, as shown in FIG. 5. In FIG. 5, the lure article 20 in the form of a "jig" has received an acid treated outer surface 30 which is pitted, rough, and very dull resembling the appearance of a lead cast jig. The dull, acid treated outer surface 30 helps in fishing because it does not frighten or deter the fish from striking the lure. In FIG. 6, a split sinker 40 which is generally oval shaped (but which can be spherical) is illustrated having a slot 42 therein so that the split sinker 40 can be added to the fishing line. The outer surface 43 is pitted, because of the acid washing as shown in FIG. 4, to provide the same dull outer finish as with the embodiment of FIG. 5. In teaching with the method of the present invention, a metallic alloy material with a melting point substantially lower than the melting point of the hook portion is provided for the head portion. Thus, the hook 26 would be of a higher melting point material, such as stainless steel, while the alloy of the present invention is of a substantially lower melting point than stainless steel, such as for example, a melting point of 50020 F.-600° F. or less. Thus, the present invention preferably uses an alloy which is about 90%-94% tin, and about 6%-8% antimony. The alloy is preferably is somewhat lighter than lead, having a density of about 0.260-0.275 pounds per square inch. The preferred alloy melts at a temperature of about 425° F.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A fishing lure article comprising:
   (a) a metallic hook portion having a barbed end portion;
   (b) a weighted head portion opposite the barbed end, and of a metallic alloy material with a melting point substantially lower than the melting point of the hook portion; and
   (c) wherein the metallic alloy forming the head portion comprises tin and antimony, and is about ninety percent tin (Sn), and substantially lead free.

2. The article of claim 1, wherein the alloy is about ninety percent tin (Sn), and about eight percent antimony (Sb).

3. The article of claim 1, wherein the alloy of the head portion is about ninety percent tin (Sn) and between about four and eight percent antimony (Sb).

4. The article of claim 1, wherein the alloy comprises between ninety and ninety-four percent tin (Sn) and between about six and eight percent antimony (Sb).

5. The article of claim 1, wherein the outer surface of the weighted head portion has a dull treated outer surface.

6. A method of forming a fishing article, comprising the steps of:
   (a) melting a mass of substantially lead free alloy of about ninety to ninety-four percent tin (Sn) and about four to eight percent antimony (Sb) at a first melting point temperature of about 500° to 600° Fahrenheit or less;

(b) casting the mass of melted metal alloy material to a hook portion of material with a second and substantially higher melting point;

(c) allowing the mass of alloy to cool until it hardens, forming an attachment to the hook portion and a cast article that includes the hook portion and the mass of alloy; and (d) dulling the outer surface of the mass of alloy to remove some of the cast shininess.

7. The method of claim 6, wherein the alloy is dulled to step "d" using an acid.

8. The method of claim 6, wherein the mass of alloy is dipped in an acid solution until the cast shininess is substantially removed.

9. The method of claim 6, wherein in step "b" the alloy includes about ninety percent tin (Sn) and about four percent antimony (Sb).

10. The method of claim 6, wherein the alloy has a lower density than lead.

11. The method of claim 6, wherein the alloy melts at a temperature of about 425° Fahrenheit.

12. The method of claim 6, wherein the alloy has a density of between 0.260 and 0.275 pounds per square inch.

13. A method of forming a fishing article, comprising the steps of:

(a) melting a mass of substantially lead free alloy of about ninety to ninety-four percent tin (Sn) and about four to eight percent antimony (Sb) at a first melting point temperature of about 500° to 600° Fahrenheit or less;

(b) casting the mass of melted alloy material;

(c) allowing the mass of melted alloy material to cool until it hardens; and (d) dulling the outer surface of the mass of alloy to remove some of the cast shininess.

14. A fishing lure article comprising:

(a) a metallic hook portion having a barbed portion;

(b) a weighted head portion opposite the barbed end, and of a metallic alloy material with a melting point substantially lower than the melting point of the hook portion;

(c) wherein the metallic alloy forming the head portion is about ninety percent tin (Sn), and substantially lead free; and (d) the head having a dulled outer surface.

15. A fishing sinker article adapted for attachment to a fishing line comprising:

(a) a metallic portion of a metallic alloy material with a melting point lower than the melting point of lead; and (b) wherein the metallic alloy comprises tin and antimony, and is about ninety percent tin (Sm), and substantially lead free.

16. The article of claim 15, wherein the alloy is about ninety percent tin (Sn), and about eight percent antimony (Sb).

17. The article of claim 15, wherein the alloy is about ninety percent tin (Sn) and between about four and eight percent antimony (Sb).

18. The article of claim 15, wherein the alloy comprises between ninety and ninety-four percent tin (Sm) and between about six and eight percent antimony (Sb).

19. The article of claim 15, wherein the outer surface of the article has a dull treated outer surface.

20. A method of forming a fishing article, comprising the steps of:

(A) melting a mass of substantially lead free alloy of about ninety to ninety-four percent tin (Sn) and about four to eight percent antimony (Sb) at a first melting point temperature of about 500° to 600° Fahrenheit of less;

(b) casting the mass of melted metal alloy material into a sinker member having a slotted portion for receiving a fishing line therein so that the sinker member can be attached to a fishing line at the slotted portion;

(c) allowing the mass of alloy to cool until it hardens; and (d) dulling the outer surface of the mass of alloy to remove some of the cast shininess.

21. The method of claim 20, wherein the alloy is dulled to step "d" using an acid.

22. The method of claim 20, wherein the mass of alloy is dipped in an acid solution until the cast shininess is substantially removed.

23. The method of claim 20, wherein in step "b" the alloy includes about ninety percent tin (Sn) and about four percent antimony (Sb).

24. The method of claim 20, wherein the alloy has a lower density than lead.

25. The method of claim 20, wherein the alloy melts at a temperature of about 425° Fahrenheit.

26. The method of claim 20, wherein the alloy has a density of between 0.260 and b 0.275 pounds per square inch.

27. A method of forming a line sinker fishing article that can attach to a fishing line, comprising the steps of:

(a) melting a mass of substantially lead free alloy of about ninety to ninety-four percent tin (Sn) and about four to eight percent antimony (Sb) at a first melting point temperature of about 500° to 600° Fahrenheit of less;

(b) casting the mass of melted alloy material into a rounded sinker member having a slot therein for receiving a fishing line thereinto so that the sinker member can be mounted on the line at the slot;

(c) allowing the mass of melted alloy material to cool until it hardens; and (d) dulling the outer surface of the mass of alloy to remove some of the cast shininess.

* * * * *